July 17, 1923.
C. C. BOHNER
GLASSWORKING MOLD
Filed July 14, 1919
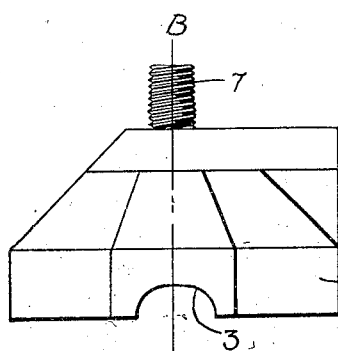
Fig. 1
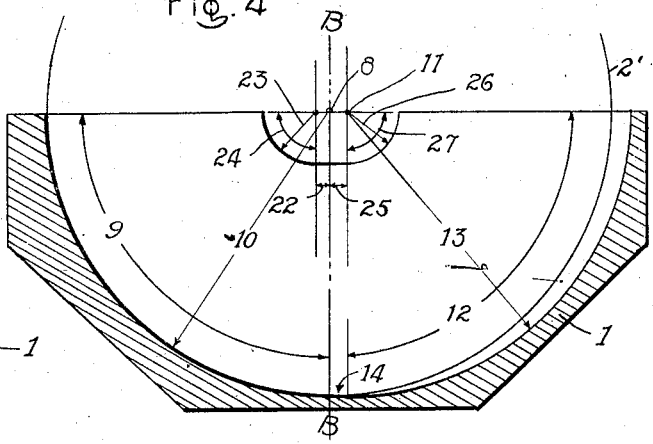
Fig. 4
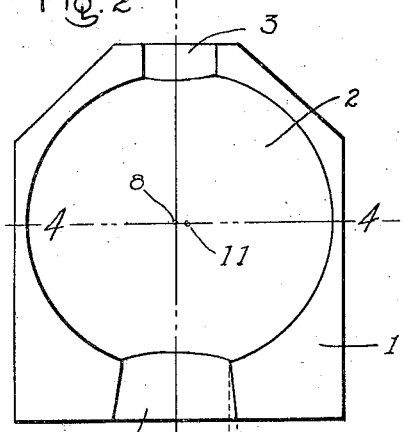
Fig. 2
Fig. 3
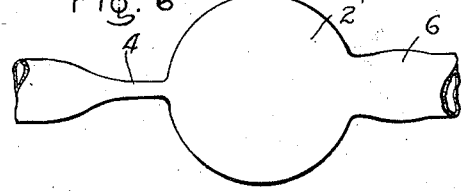
Fig. 6
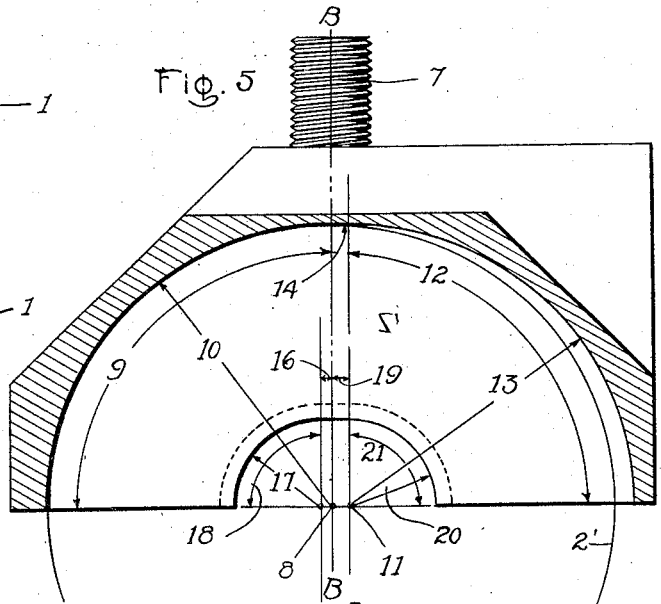
Fig. 5
INVENTOR:-
CLYDE C. BOHNER
BY Albert G. Davis
HIS ATTORNEY Patented July 17, 1923.

1,462,362

UNITED STATES PATENT OFFICE.

CLYDE C. BOHNER, OF CHICAGO, ILLINOIS, ASSIGNOR TO GENERAL ELECTRIC COMPANY, A CORPORATION OF NEW YORK.

GLASSWORKING MOLD.

Application filed July 14, 1919. Serial No. 310,802.

*To all whom it may concern:*

Be it known that I, CLYDE C. BOHNER, a citizen of the United States, residing at Chicago, in the county of Cook, State of Illinois, have invented certain new and useful Improvements in Glassworking Molds, of which the following is a specification.

My invention relates to molds for glass blowing and more particularly to molds for use with automatic or semi-automatic glass blowing machines such as the bulb machines disclosed in British Patent No. 12,824 of 1911 to Kremenezky and in the Quackenbush and Quackenbush Patent No. 1,313,205 of August 12, 1919. My invention is particularly adapted to the manufacture of bulbs for incandescent lamps and like devices but it is of application to blown glass bodies of revolution in general and the term "bulb" as used in this application comprehends such bodies.

In the machines just mentioned the bulbs are blown from glass tubing which is rotated during the whole operation. The tubing is first locally heated and then drawn out to form a portion of small diameter which is termed the "contraction". The tubing adjacent to the contraction is then subjected to intensive local heating until it softens whereupon a mold, attached to a mold carrier, is brought into operative position from underneath and to one side of the tubing. Air pressure for blowing the bulb is then admitted to the tubing. The bulb is blown in a hemispherical cavity in the mold, the wall of the mold on the entrance side i. e., the side toward which the bulb is rotating, extending above the top plane of the mold cavity to provide a slight clearance for the bulb as it enters the mold cavity. However, since the whole surface of the hemispherical mold cavity is used in forming the bulb, a tendency exists for the bulb to roll up or "climb" out of the mold and to catch or "hang" on the edge of the clearance extension. This difficulty is very prevalent and results in irregularities in the shape and thickness of the bulb.

My object is to produce a mold which will overcome the difficulties outlined above. Broadly, my invention consists in having the mold, where the glass first touches the surface, afford traction such as to force the bulb down into the mold rather than force it out of the mold. This is the main principle involved and the rest is merely a question of design. I accomplish the object by giving clearance on the entrance side of the mold cavity and forming the bulb on the exit side of the cavity. This may be done by having the mold cavity surface on the entrance side disposed at a greater distance from the axis of rotation of the bulb or tubing than the surface on the exit side and, as bulbs are ordinarily surfaces of revolution, a convenient arrangement is to separate two similar portions, say quarters, of such surface of revolution by a transversely flat surface and to have the larger portion of the latter disposed on the entrance side of the said axis of rotation. More specifically for example, I secure this result by making the mold cavity for a round or globular bulb of two quarter-spheres separated by a semi-cylinder, the forming of the bulb being practically done by the last quarter-sphere section of the mold cavity.

My invention will be more clearly understood by referring to the accompanying drawings in which Fig. 1 is an elevation of the contraction end of my improved mold suitable for a miniature incandescent lamp bulb; Fig. 2 is a top plan view thereof; Fig. 3 is an elevation of the neck end of the same; Fig. 4 is an enlarged sectional elevation along the line 4—4 of Fig. 2 looking toward the contraction end of the mold; Fig. 5 is an enlarged sectional elevation (inverted) along the line 4—4 of Fig. 2 looking toward the neck end of the mold and Fig. 6 is an elevation of a completed bulb.

To facilitate the explanation of my invention, I shall refer to that part of the mold which is on the left side of the vertical line B—B as the left side of the mold and to that on the right side of the line, as the right side of the mold.

Referring to the drawing, the mold 1, suitable for the production of bulbs from tubing in the manner disclosed in the patents hereinbefore referred to, contains the mold cavity 2 for the main bulb portion 2'. The portion 3 provides clearance for the tube contraction 4 and the neck portion 5 forms the bulb neck 6. The mold 1 may be attached to a mold carrier forming part of a machine, such as that disclosed in the patents above referred to, by means of the stud bolt 7.

The left side of the mold cavity 2 is a quarter-sphere, the surface of which, when intersected by a plane 4—4 passing through its center 8 perpendicular to its longitudinal axis B—B, produces the arc 9 having a radius 10 which is the radius of the quarter-sphere. The right side of the mold cavity 2 is a quarter-sphere, the surface of which when intersected through its center 11 by the plane 4—4 previously described, produces the arc 12 having a radius 13 which is equal to the radius 10 since the two quarter-spheres are preferably made equal. Between the two quarter-spheres is a semi-cylinder whose longitudinal axis joins the centers of the two quarter-spheres and whose radius is equal to the radius of a quarter-sphere. The plane 4—4 previously described intersects the curved surface of this semi-cylinder in a straight line 14. The proper length of the line 14 or, in other words, the proper length of the semi-cylinder, is determined by experiment. The radius of the quarter-spheres is made substantially equal to the radius of the bulb to be blown. The actual forming of the bulb is accomplished by the wall of the quarter-sphere cavity on the left side of the mold cavity, when the rotation of the tubing is such as to enter the right side of the mold, the axis of the tubing coinciding with the longitudinal axis B—B of the left quarter-sphere cavity. If the traction offered by the left quarter-sphere cavity becomes too great the bulb will be displaced to the right side of the mold rather than forced out of it. Practically, as soon as the bulb has started on its movement to the right side of the mold, the tractive force which started it decreases to a point where it is negligible and the bulb returns to the left side of the mold.

In boring the neck and contraction portions, it is found desirable to give a clearance at both the points where the glass travels into and where it travels out of the mold cavity. This is because the mold does not lie flat when in a working position in a machine, such as disclosed in the patents previously referred to, but stands at an angle and the hot glass would otherwise sag at the neck and contraction portions of the mold and stick at the lowest point and also cause the neck to roll in in such a way as to result in an undersized neck in the finished bulb. This clearance will also compensate for the wear in the two spindle bearings to which the chucks for holding the tubing are attached.

The neck portion 5 has, as heretofore, a taper 15 (Fig. 2) extending outward from the mold cavity 2. The surface of the neck portion is, in effect, the combined curved surface of two truncated quarter-cones separated by a flat surface inclined downwardly and outwardly from the mold cavity 2 (Fig. 2), the axes of the quarter-cones being in the plane of the top of the mold. The axis of the left cone section is moved a distance 16 to the left of the axis B—B of the left quarter-sphere. The radius 17 of the inner end of the left cone section describes the arc 18 shown in the view of Fig. 5. The axis of the right cone section is moved a distance 19, equal to the length of the line 14 of the mold cavity to the right of the axis B—B of the left quarter-sphere. The radius 20, equal to the radius 17, of the inner end of the right cone section describes the arc 21 shown in the view of Fig. 5. Between the two cone sections is the flat surface in width equal to the sum of the distance 16 and the distance 19. The heights or lengths of the axes of the cones are equal and the lengths of the curved surfaces of the cones and of the flat surface between the cones are necessarily equal.

The surface of the contraction portion 3 (Fig. 4) is composed of the surfaces of two quarter-cylinders separated by a rectangular prism. The axis of the left cylinder section is moved a distance 22, equal to the distance 16 of the neck portion, to the left of the axis B—B of the left quarter-sphere of the mold cavity and the cylinder section has a radius 23 which describes the arc 24 shown in the view of Fig. 4. The axis of the right cylinder section is moved a distance 25, equal to the distance 19 and the length of the line 14 previously described, to the right of the axis B—B previously described and the cylinder section has a radius 26, equal to the radius 23, which describes the arc 27 shown in the view of Fig. 4. Between the two quarter-cylinders is a rectangular prism whose width is equal to the sum of the distances 22 and 25, which is equal to the sum of the distances 16 and 19 previously described, and whose breadth equals the radius 23 or 26 of the cylindrical section. The axes of the two cylindrical and one rectangular sections are of equal length.

Satisfactory bulbs have been produced in a mold in which the various quantities hereinbefore referred to had substantially the following proportions:

| | |
|---|---|
| Radii 10 and 13 | 1 |
| Width of the flat portions (14, 19 and 25) | .027 |
| Taper 15 | 1 to 7.4 |
| Width of flat portions (16 and 22) | .02 |
| Radii (17, 20) | .353 |
| Radii (23, 26) | .126 |

What I claim as new and desire to secure by Letters Patent of the United States, is:—

1. A mold adapted for use in lathe type machines for blowing bulbs from rotating glass tubing and having a cavity which is substantially one-half of a surface of revolution corresponding to the shape of the bulb to be produced, said cavity extending out more on one side than on the opposite side of a longitudinal axis determined by the mounting for said mold, and arranged to coincide with the axis of rotation of said glass tubing.

2. A mold adapted for use in lathe type machines for blowing bulbs from rotating glass tubing and having a cavity which is approximately one-half of a sphere, the edge of the boundary surface of said cavity being somewhat farther distant on one side than on the opposite side of a longitudinal axis determined by the mounting for said mold, and arranged to coincide with the axis of rotation of said glass tubing.

3. A mold adapted for use in lathe type machines for blowing bulbs from rotating glass tubing and having a cavity which is made up of two substantially quarter spherical portions one of which has passing through its center the longitudinal axis of the mold which is arranged to coincide with the axis of rotation of said glass tubing, and the other of which has its center displaced a short distance from the said axis in order to allow clearance for the rotating bulb as formed.

4. A mold adapted for use in lathe type machines for blowing bulbs from rotating glass tubing and having a cavity with a neck portion which is substantially one-half of a surface of revolution corresponding to the shape of the bulb to be produced, said cavity extending out more on one side than on the opposite side of a longitudinal axis determined by the mounting for said mold, and arranged to coincide with the axis of rotation of said glass tubing.

In witness whereof I have hereunto set my hand this 9th day of July, 1919.

CLYDE C. BOHNER.